US012686240B2

(12) United States Patent
Coughlin

(10) Patent No.: US 12,686,240 B2
(45) Date of Patent: Jul. 21, 2026

(54) METHOD AND APPARATUS FOR MOVING/TRANSPORTING A WHEELED VEHICLE

(71) Applicant: Robert K. Coughlin, Danville, IN (US)

(72) Inventor: Robert K. Coughlin, Danville, IN (US)

( * ) Notice: Subject to any disclaimer, the term of this patent is extended or adjusted under 35 U.S.C. 154(b) by 385 days.

(21) Appl. No.: 18/470,241

(22) Filed: Sep. 19, 2023

(65) Prior Publication Data

US 2025/0091396 A1 Mar. 20, 2025

(51) Int. Cl.
B60D 1/167 (2006.01)

(52) U.S. Cl.
CPC ................................... B60D 1/167 (2013.01)

(58) Field of Classification Search
CPC ...................................................... B60D 1/167
See application file for complete search history.

(56) References Cited

U.S. PATENT DOCUMENTS

| | | | | | |
|---|---|---|---|---|---|
| 5,971,360 | A * | 10/1999 | Sinsley | ................... | B66F 3/005 |
| | | | | | 254/8 B |
| 6,488,157 | B2 * | 12/2002 | Chen | ...................... | B66F 3/005 |
| | | | | | 211/20 |
| 6,802,493 | B2 * | 10/2004 | Lance | ..................... | B66F 3/005 |
| | | | | | 254/8 B |
| 7,100,928 | B1 * | 9/2006 | VanValkenburgh | .... | B66F 3/005 |
| | | | | | 280/166 |
| 7,350,790 | B1 * | 4/2008 | Wilson | .................... | B60D 1/00 |
| | | | | | 280/47.131 |
| 7,997,558 | B1 * | 8/2011 | Miller | ..................... | B66F 13/00 |
| | | | | | 254/2 B |
| 8,403,353 | B2 * | 3/2013 | Fink | ...................... | B60P 3/1033 |
| | | | | | 280/789 |
| 8,876,140 | B2 * | 11/2014 | Barnett | ................... | B60P 3/122 |
| | | | | | 280/401 |
| 9,428,156 | B2 * | 8/2016 | Davison | ................. | B60S 13/02 |
| 9,873,445 | B2 * | 1/2018 | Davison | ................. | B60S 13/02 |
| 2004/0108494 | A1 * | 6/2004 | Garrelts | ................... | B62B 3/08 |
| | | | | | 254/8 B |
| 2009/0309329 | A1 * | 12/2009 | Davison | ................... | B62B 3/10 |
| | | | | | 280/418 |
| 2012/0091688 | A1 * | 4/2012 | Fink | ...................... | B60P 3/1033 |
| | | | | | 280/414.1 |

* cited by examiner

*Primary Examiner* — Tyler J Lee
(74) *Attorney, Agent, or Firm* — Wood, Phillips, Katz, Clark & Mortimer

(57) ABSTRACT

A method of transporting a wheeled vehicle along an underlying surface, including the steps of: obtaining a moving apparatus with a frame, at least a first wheel, and at least a first lifting portion; placing the moving apparatus in an operative position wherein the vehicle center of gravity is between at least the first wheel and first lifting portion; exerting an upward force on the at least one lifting portion using the at least first wheel as a fulcrum and thereby causing the moving apparatus to exert a force on the wheeled vehicle that causes the wheeled vehicle to assume a transporting orientation wherein the vehicle is tipped and supported only by the at least first wheel; and with the wheeled vehicle in the transporting orientation, exerting a force on at least one of the moving apparatus and the wheeled vehicle to cause the at least first wheel to be rolled against the underlying surface.

21 Claims, 8 Drawing Sheets

FRAME
12

LIFTING
PORTION(S)
16

WHEEL(S)
14

APPARATUS   10

FIRST
LOCATION
20

SECOND
LOCATION
22

WHEELED VEHICLE   18

OBTAIN
APPARATUS
24

PLACE
APPARATUS
IN
OPERATIVE
POSITION
26

EXERT
FORCE
ON
LIFTING
PORTION
28

EXERT FORCE ON
WHEELED VEHICLE
AND/OR MOVING
APPARATUS
30

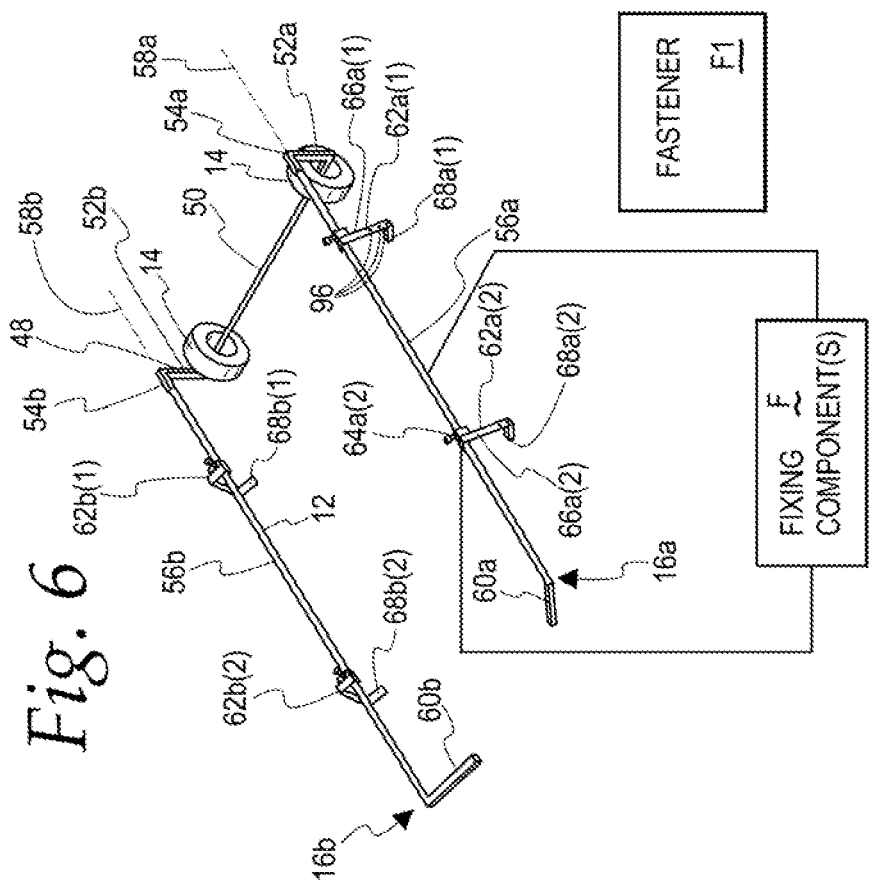
*Fig. 6*
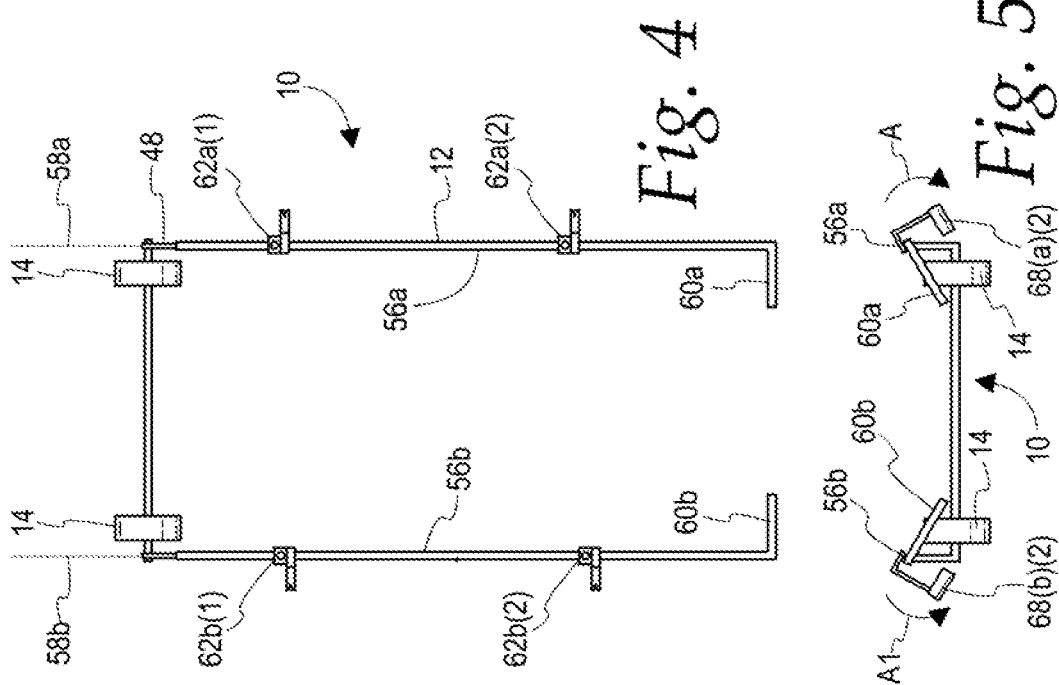
*Fig. 4*
*Fig. 5*

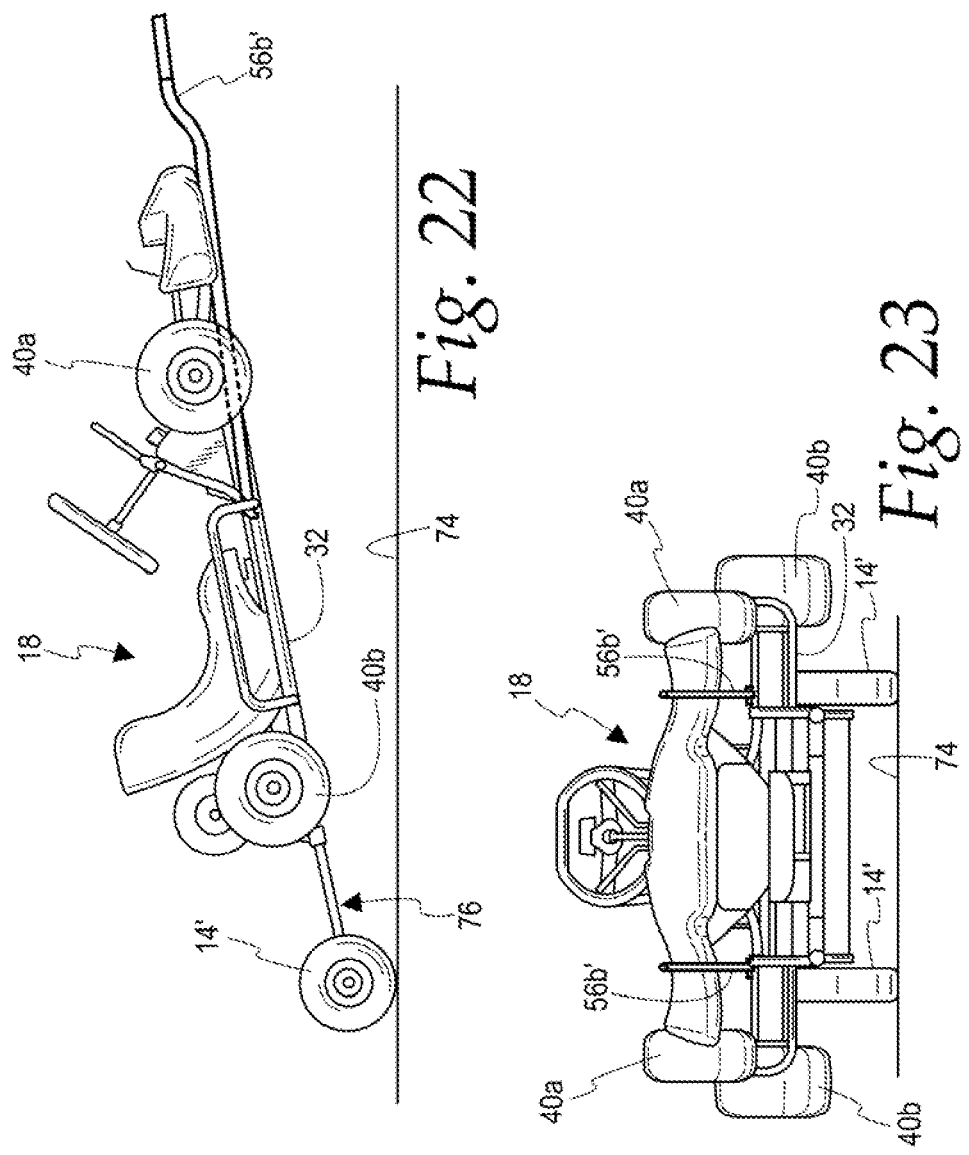

METHOD AND APPARATUS FOR MOVING/TRANSPORTING A WHEELED VEHICLE

BACKGROUND OF THE INVENTION

Field of the Invention

This invention relates to wheeled vehicles, such as go-karts, and, more particularly, to a method and apparatus for manually moving/transporting such vehicles.

Background Art

Wheeled vehicles, commonly identified as go-karts, are being used for recreational and other purposes worldwide. Go-kart racing is an ever-growing industry. Different courses for racing exist, ranging from those on oval tracks to those conducted on rugged terrain.

Go-karts are also commonly used for simple recreational purposes without engaging in racing activities. Still further, variations thereof are used to assist persons performing tasks in numerous industries. As examples, the vehicles may be used to transport tools, equipment, materials, personnel, etc. between and around work sites.

While the invention herein will focus on go-karts, it should be understood that "go-kart", as used throughout the Detailed Description and claims herein, encompasses different categories of wheeled vehicles that may not be conventionally classified as go-karts. For example, the aforementioned wheeled vehicles used for carrying loads and assisting other work activities will be considered to be "go-karts", as will any vehicle that essentially is self-powered with multiple wheels and has a substantial weight that does not lend itself to being readily lifted by one or two persons.

There are many situations where go-karts are required to be maneuvered, other than under their own power. For example, go-karts are commonly loaded onto, and unloaded from, vehicles and trailers by being pushed up and down ramps. This is an inherently awkward operation. For example, a four-wheeled go-kart generally requires multiple persons to push and pull to effect the necessary movement thereof. This is inherently awkward and made more difficult by the fact that most force applications by persons have a component of force directed downwardly that creates resistance to rolling movement.

It is often necessary to move go-karts that have stalled or been involved in a collision on a race course. Whereas it would be desirable to quickly clear a track to continue activities, a substantial delay may result by having multiple persons pushing a disabled go-kart either off of the track or onto a trailer, or the like.

Go-karts also often have to be lifted, as to facilitate repair and/or maintenance thereof.

Another challenge is encountered when a go-kart is required to be moved/transported while on rugged terrain and powered operation thereof is not possible. Irregular terrain and awkward angling of the go-kart may make manual repositioning by the application of force through several persons impractical. Further, rolling the four wheels over irregular terrain may create substantial resistance. Still further, pushing a go-kart over such terrain may inflict damage on tires or other parts of the go-kart. Further yet, a top-heavy go-kart may be prone to tipping as it is pushed upon by a number of people.

Generally, by reason of there being three or four tires, each with a substantial contact area with underlying terrain, go-karts are inherently difficult to roll when they are not movable under their own power. In anticipation of having to move go-karts, it may be necessary to keep many persons on hand dedicated to the task of repositioning the same.

Once a go-kart is maneuvered onto a conventional trailer, a challenge still remains. That is, multiple persons must generally be recruited to move the trailer or heavier trailers may require another powered vehicle to be connected thereto.

Further, such trailers are generally large and are themselves difficult to move around when not in use. They may also require a relatively large space when they are stored.

Wherever go-karts are utilized, there remains a need to provide a convenient and efficient way to move/transport go-karts short distances, as from out of a ditch or a traffic pattern on a track, and to move a go-kart longer distances, such as for loading or unloading, or even longer distances to allow transportation as around a large facility where the go-karts are operated, stored, maintained, etc.

The industry has continued to contend with many of the above problems since no practical solutions thereto have been arrived at.

SUMMARY OF THE INVENTION

In one form, the invention is directed to a method of transporting a wheeled vehicle along a horizontal underlying surface. The wheeled vehicle has a center of gravity between first and second locations on the wheeled vehicle spaced horizontally from each other along a first line. The method includes the steps of: obtaining a moving apparatus having a frame with at least a first wheel and at least a first lifting portion; placing the moving apparatus in an operative position with respect to the wheeled vehicle wherein as viewed from a perspective along a horizontal line orthogonal to the first line: a) the at least first wheel is spaced away from the first location a distance to beyond the center of gravity; and b) the at least first lifting portion is spaced away from the second location a distance to beyond the center of gravity; with the moving apparatus in the operative position, exerting an upward force on the at least one lifting portion using the at least first wheel as a fulcrum on the underlying surface and thereby causing the moving apparatus to exert a force on the wheeled vehicle that causes the wheeled vehicle to assume a transporting orientation wherein the first location on the wheeled vehicle is raised relative to the second location on the wheeled vehicle; and with the wheeled vehicle in the transporting orientation, exerting a force on at least one of the moving apparatus and the wheeled vehicle that causes the moving apparatus to be advanced by causing the at least first wheel to be rolled against the horizontal underlying surface.

In one form, the wheeled vehicle has a frame and a front and rear. With the moving apparatus in the operative position, the at least first wheel extends past one of the front and rear of the vehicle and the at least first lifting portion extends past the other of the front and rear of the vehicle.

In one form, the at least first wheel includes the first wheel and a second wheel spaced from the first wheel. The at least first lifting portion includes the first lifting portion and a second lifting portion spaced from the first lifting portion.

In one form, the wheeled vehicle has a plurality of wheels each having a rim and a tire mounted on the rim. The moving apparatus has at least a first lifting part. The step of causing the moving apparatus to exert a force on the wheeled vehicle involves causing the at least first lifting part to exert a force on one of the vehicle wheels.

In one form, the at least first lifting part includes the first lifting part and a second lifting part. The step of causing the moving apparatus to exert a force on the wheeled vehicle involves causing the second lifting part to exert a force on a second of the vehicle wheels.

In one form, the at least first wheel includes the first wheel and a second wheel spaced from the first wheel. The moving apparatus frame has a mount portion for the first and second wheels. A first elongate arm extends from the mount portion and defines the first lifting portion.

In one form, the method further includes the step of guiding the at least first lifting part along the first elongate arm to place the at least first lifting part in a lifting location with respect to the one vehicle wheel.

In one form, the method further includes the step of repositioning the first elongate arm relative to the mount portion to change an orientation of the at least first lifting part relative to the one vehicle wheel.

In one form, the step of repositioning the first elongate arm involves engaging the first lifting part and through manipulation of the first lifting part repositioning the first elongate arm by turning the first elongate arm around an axis.

In one form, the moving apparatus further includes a second elongate arm that extends from the mount portion and defines the second lifting portion. The at least first lifting part includes the first lifting part and a second lifting part, spaced from the first lifting part. The second lifting part is on the second elongate arm. The step of causing the moving apparatus to exert a force on the wheeled vehicle involves causing the second lifting part to exert a force on the second vehicle wheel.

In one form, the step of causing the moving apparatus to exert a force on the wheeled vehicle involves causing the at least first lifting part to exert a force on the rim on the one vehicle wheel.

In one form, each of the first and second lifting parts respectively has cantilever mounted first and second parts.

In one form, with the moving apparatus in the operative position, the first and second cantilever mounted parts project in opposite directions away from respective first and second elongate arms.

In one form, the wheeled vehicle has a frame. The moving apparatus frame includes first and second separate units. The step of placing the moving apparatus in the operative position involves connecting: a) the first unit with the at least first wheel with the wheeled vehicle frame; and b) the second unit with the at least one lifting portion to the wheeled vehicle frame.

In one form, the first unit and second unit are independently connected to the frame on the wheeled vehicle.

In one form, the method further includes the step of using a lift mechanism to elevate the frame on the wheeled vehicle before connecting the first unit to the wheeled vehicle frame.

In one form, the method further includes the step of adjusting a position of the cantilever mounted first part relative to another part of the first lifting part.

In one form, the wheeled vehicle is a go-kart.

In one form, the invention is directed to the moving apparatus as described above.

BRIEF DESCRIPTION OF THE DRAWINGS

FIG. 4 is a plan view of one form of the inventive apparatus as schematically depicted in FIG. 1;

FIG. 5 is a front elevation view of the apparatus in FIG. 4;

FIG. 6 is a perspective view of the apparatus in FIGS. 4 and 5;

FIG. 22 is a view of the components in the state in FIGS. 19-21 and with the vehicle changed to a transporting orientation through the apparatus; and FIG. 23 is a front elevation view of the components in the FIG. 22 state.

DETAILED DESCRIPTION OF THE PREFERRED EMBODIMENT

Figures 1, 2, 3:
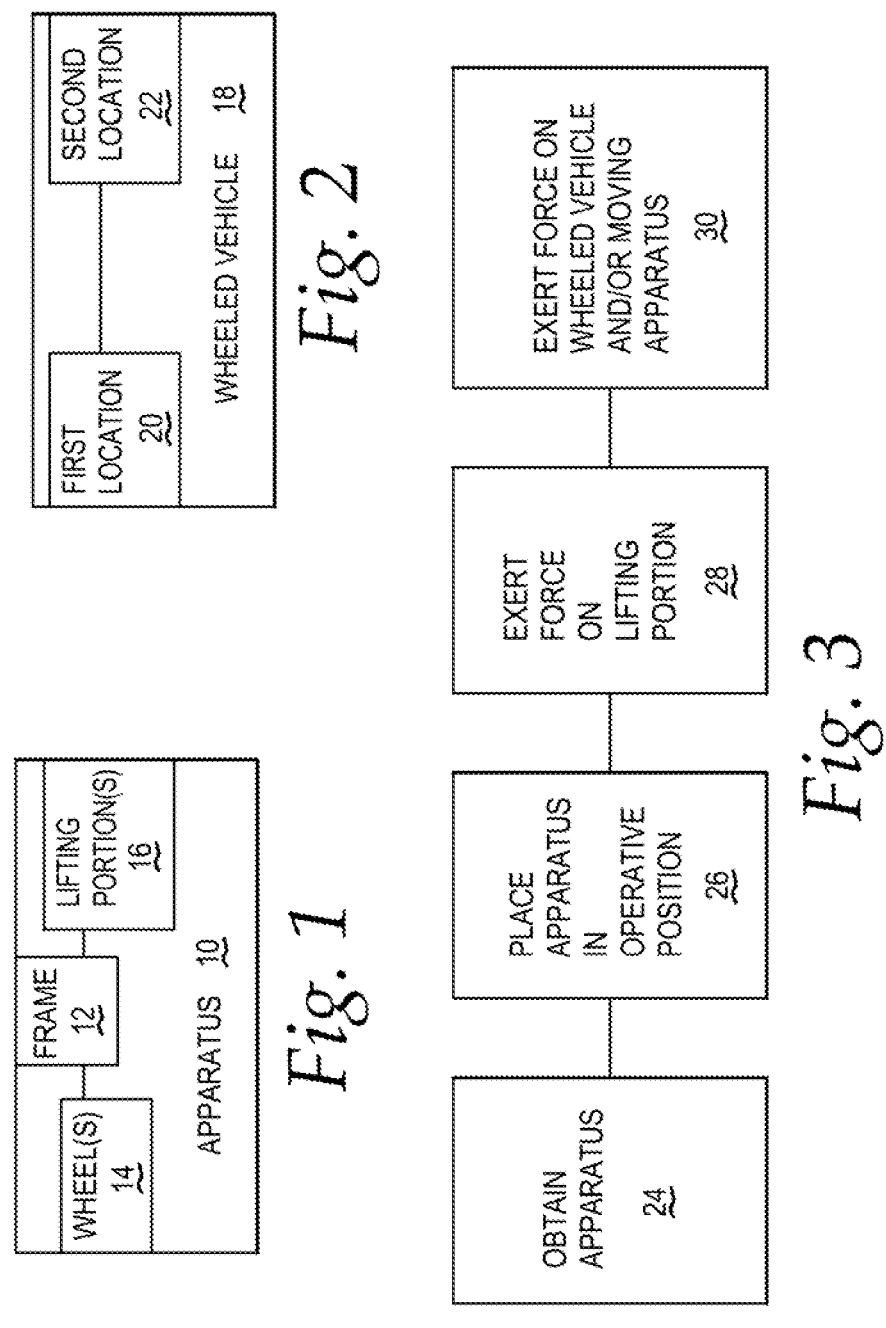
FIG. 1 is a schematic representation of an apparatus, according to the invention, for facilitating moving of a wheeled vehicle.
FIG. 2 is a schematic representation of a wheeled vehicle that can be used in conjunction with the apparatus in FIG. 1.
FIG. 3 is a schematic representation of a method of moving/transporting a wheeled vehicle as in FIG. 2 along an underlying surface using the inventive apparatus as in FIG. 1.

In FIG. 1, an apparatus for moving/transporting a wheeled vehicle, according to the present invention, is shown in schematic form at 10. The apparatus/moving apparatus 10 has a frame 12 on which there is at least one wheel 14 and at least one lifting portion 16.

The apparatus is configured to transport/move a wheeled vehicle, of the type shown schematically at 18 in FIG. 2. The wheeled vehicle 18 has a center of gravity between first and second locations 20, 22, respectively, spaced horizontally from each other along a first line.

The wheeled vehicle 18 is shown schematically to encompass virtually any type of vehicle that has at least three wheels, and most commonly at least four wheels, and that falls into the category of a "go-kart" as described in the Background portion herein.

The schematic showing of the apparatus 10 is intended to encompass forms of the components, as described in detail hereinbelow, and virtually an unlimited number of variations thereof and their interactions. The specific forms of the apparatus 10, as described hereinbelow, are exemplary in nature only and should not be viewed as limiting.

With the apparatus 10, as shown in FIG. 1, and the wheeled vehicle 18, as shown in FIG. 2, and potentially different forms of each, a method of transporting a wheeled vehicle along a horizontal underlying surface, according to the present invention, can be carried out as shown in flow diagram form in FIG. 3.

As shown at block 24, an apparatus, as depicted schematically in FIG. 1 is obtained.

As shown at block 26, the moving apparatus is placed in an operative position with respect to the wheeled vehicle 18 whereby, as viewed from a perspective along a horizontal line orthogonal to the aforementioned first line: a) at least a first wheel 14 on the apparatus 10 is spaced away from the first location 20 a distance to beyond the center of gravity; and b) at least a first lifting portion 16 on the apparatus 10 is spaced away from the second location 22 a distance to beyond the center of gravity.

As shown at block 28, with the moving apparatus 10 in the operative position, an upward force is exerted on at least one lifting portion 16 using at least the first wheel 14 as a fulcrum on an underlying surface, thereby causing the moving apparatus 10 to exert a force on the wheeled vehicle 12 that causes the wheeled vehicle to assume a transporting orientation wherein the first location 22 is raised relative to the second location 22 thereon.

As shown at block 30 with the wheeled vehicle 18 in the transporting orientation, a force is exerted on at least one of the moving apparatus 10 and the wheeled vehicle 18 that causes the moving apparatus to be advanced by causing the at least one wheel 14 to be rolled against an underlying surface.

It should be noted that the apparatus 10 and wheeled vehicle 18 have been described with respect to a "horizontal" underlying surface on which the wheeled vehicle 18 is situated. The horizontal underlying surface is used for simplicity only as a frame of reference to define the relationship of the components on the apparatus 10, the wheeled vehicle 18, and their interaction. This orientation should not be viewed as limiting, as the same principles would be applied regardless of the attitude of the supported wheeled vehicle 18 and the nature of the underlying surface. As just one example, the apparatus 10 may be operatively engaged with the vehicle 18 supported on an inclined ramp surface.

The schematic depiction of the method is intended to encompass the forms thereof described hereinbelow as well as variations thereof that would be evident to one skilled in the art based upon the inventive teachings herein. The specific forms of the method described hereinbelow should not be viewed as limiting.

Specific exemplary forms of the apparatus 10 and the wheeled vehicle 18 and their interactions, according to the present invention, will be described with reference to FIGS. 4-23.

A first form of the apparatus 10 is shown in FIGS. 4-12.

The wheeled vehicle 18 depicted has a frame 32 with a front 34 and rear 36 which, for purposes of simplicity, will arbitrarily be considered to respectively correspond to the first location 20 and second location 22. The first and second locations 20, 22 are interchangeable and not required to be at the front and rear extremities of the vehicle 18.

The frame 32 supports a seat 38 for a driver.

In this embodiment, the vehicle 18 has laterally spaced front wheels 40a and laterally spaced rear wheels 40b. As previously mentioned, the number of wheels is not critical to the present invention.

With an operator/driver positioned in the seat 38, he/she is immediately behind a wheel 42 that is operated to steer the front wheels 40a.

The front wheels 40a each consists of a tire 44a mounted on a metal rim 46a.

The rear wheels 40b likewise each has a tire 44b mounted on a metal rim 46b.

The apparatus 10 has the aforementioned frame 12 which supports two wheels 14. As previously noted, the apparatus 10 may use a single wheel 14 or more than two wheels, as depicted.

The frame 12 has a mount portion 48 that is generally U-shaped, opening upwardly. The "U" shape is defined cooperatively by an axle portion 50 extending between the wheels 14 and laterally spaced uprights 52a, 52b outside of the wheel mount location. The uprights 52a, 52b respectively extend into transverse, forward projections 54a, 54b.

Elongate, substantially parallel arms 56a, 56b project in cantilever fashion forwardly away from the projections 54a, 54b, respectively. The arm 56a is connected to the projection 54a for guided turning around a fore-and-aft axis 58a. The arm 56b is likewise connected to the projection 54 for guided pivoting movement around an axis 58b. As depicted, the axes 58a, 58b are substantially parallel. This parallel relationship is not required.

The arm 56a has a gripping/graspable portion 60a that projects substantially orthogonally to the axis 58a. The arm 56b has a corresponding gripping/graspable portion 60b. The gripping/graspable portions 60a, 60b, and the arm portions immediately to the rear thereof, define the aforementioned lifting portions 16a, 16b.

Lifting parts 62a(1) and 62a(2) are provided on the elongate arm 56a with corresponding lifting parts 62b(1) 62b(2) provided on the elongate arm 56b.

All of the lifting parts 62 are shown substantially the same. The exemplary lifting part 62a(2) has a mounting sleeve 64a(2) that engages the elongate arm 56a so as to be movable guidingly relative to the frame arm 56a along the axis 58a. The connection is such that the sleeve 64a(2) is prevented from turning relative to the arm 56a around the axis 58a. One or more fixing components F may releasably fix a lengthwise location of each sleeve 64 with respect to its respective arm 56.

An arm length 66a(2) depends from the sleeve 64a(2). A cantilever mounted part 68a(2) projects from a lower region of the arm length 66a(2). The like constructed lifting parts 62a(1), 62b(1) and 62b(2) have corresponding cantilever mounted parts 68a(1), 68b(1) and 68b(2), successively.

Figures 10, 11, 12, 13:
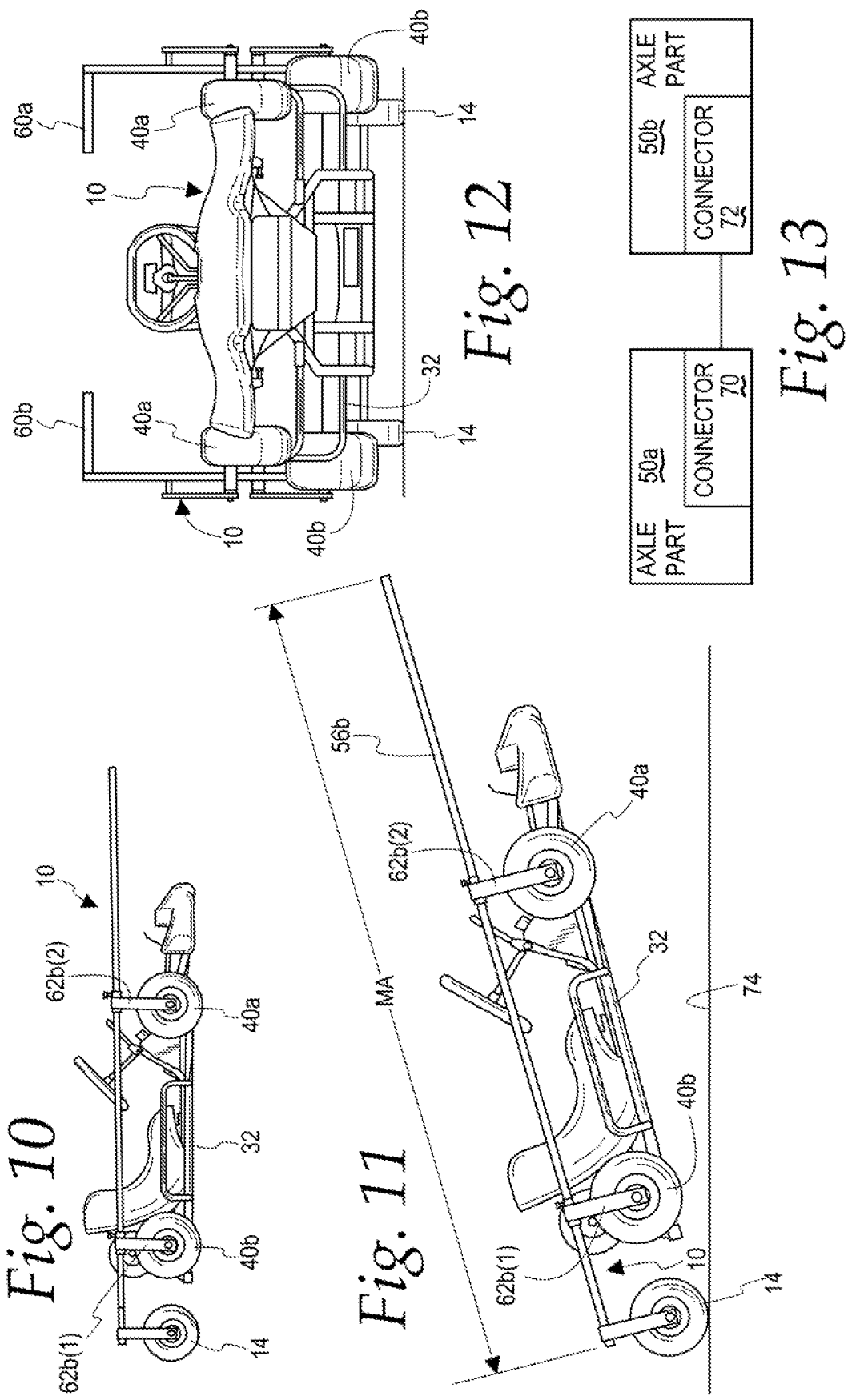
FIG. 10 is a view as in FIG. 8 from the opposite side.
FIG. 11 is a side elevation view of the components in FIGS. 7-10 with the vehicle moved through the apparatus into a transporting orientation.
FIG. 12 is a front elevation view of the components in the FIG. 11 state.
FIG. 13 is a schematic representation of an alternative form of axle to that shown in FIGS. 4-12, on which the apparatus wheels are mounted, and that allows selective changing of the length thereof.
Figure 14:
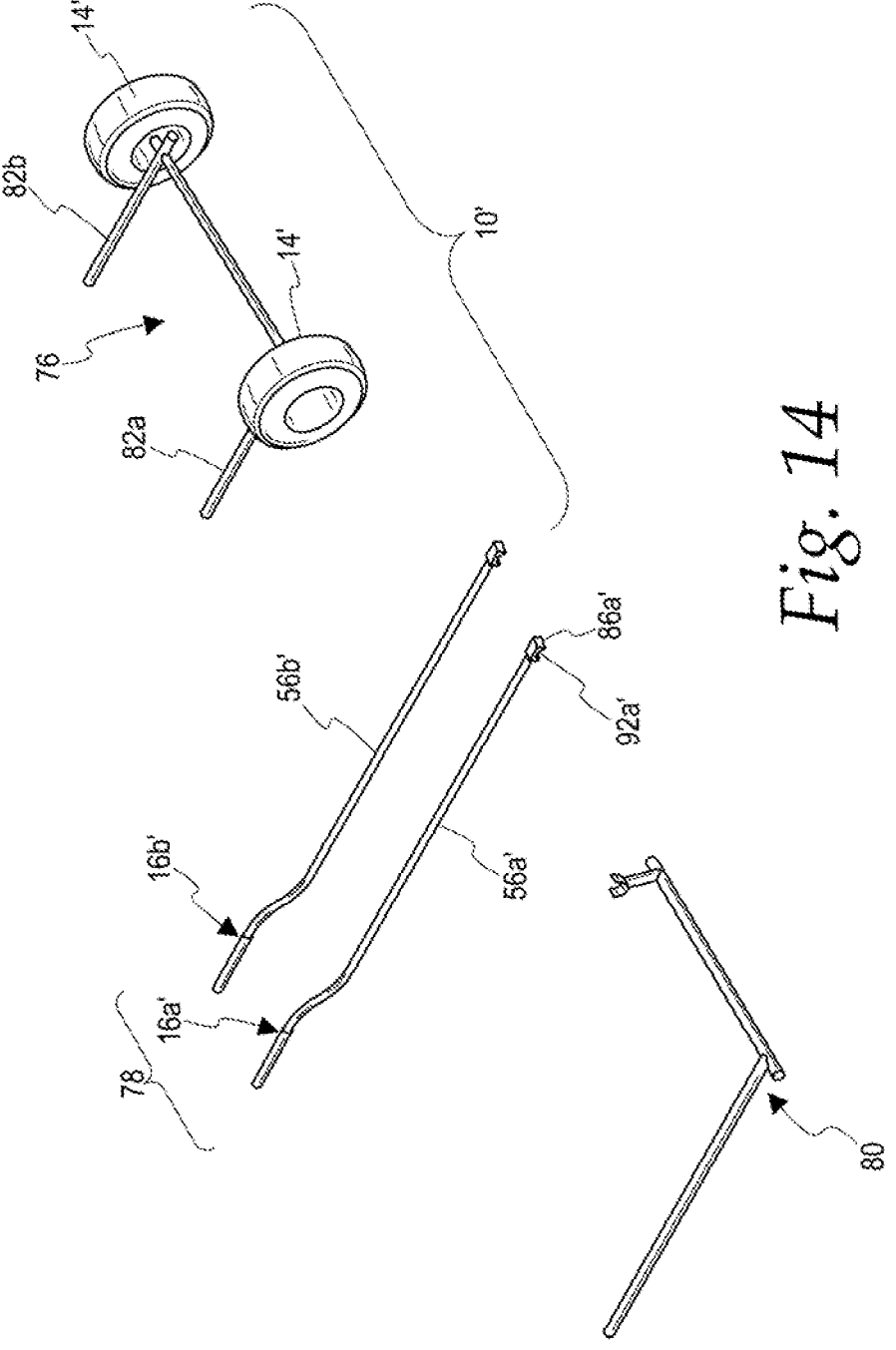
FIG. 14 is an exploded perspective view of an alternative form of apparatus, according to the present invention, together with a lift mechanism to facilitate joining of part of the apparatus to the vehicle.
Figures 15, 16, 17, 18:
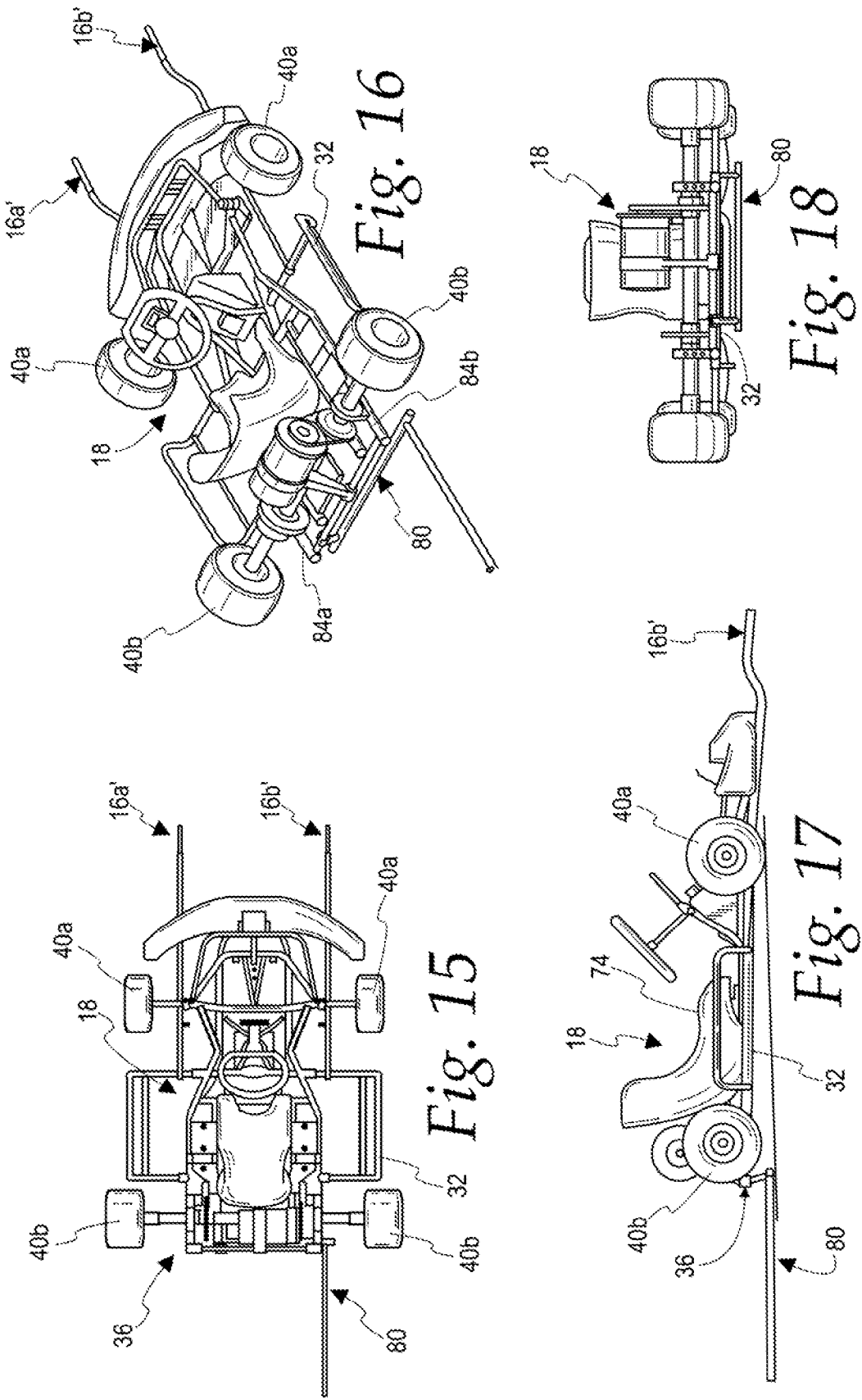
FIG. 15 is a plan view of the vehicle with the lifting mechanism in FIG. 14 in place and elongate arms, defining lifting portions of the apparatus, operatively positioned with respect to the vehicle.
FIG. 16 is a perspective view of the components in the FIG. 15 state.
FIG. 17 is a side elevation view of the components in the state in FIGS. 15 and 16.
FIG. 18 is a rear elevation view of the components in the state in FIGS. 15-17.

It should be understood that while the axle 50 is shown as having a fixed length, as shown in FIG. 13, axle parts 50a, 50b might be joined through cooperating connectors 70, 72 which allow the length of the axle 50, and thus the spacing between the wheels 14, to be selectively changed.

Alternatively, different forms of the apparatus 10, with different dimensions and dimensional relationships, may be available to accommodate different sized vehicles 18.

In one manner of operating the apparatus 10, the elongate arms 56*a*, 56*b* are independently pivoted to the FIG. 5 orientation and the apparatus 10 maneuvered relative to the vehicle 18 so that the wheels 14 are spaced rearwardly from the rear 36 of the frame 32 and the lifting portions 16*a*, 16*b* extend forwardly beyond the front 34 of the frame 32. The elongate arms 56*a*, 56*b* are spaced equidistantly from the lateral center of the vehicle 18.

With the elongate arms 56*a*, 56*b* in the FIG. 5 orientation, the lifting parts 62 can be translated along respective elongate arms 56 so that the cantilever mounted parts 68*a*(1) and 68*a*(2) align lengthwise respectively with the centers of the rear and front wheels 40*b*, 40*a* on one side of the vehicle 18, with the cantilever mounted parts 68*b*(1), 68*b*(2) aligned lengthwise with the centers of the wheels 40*b*, 40*a* on the other side of the vehicle 18.

The lifting parts 62 are dimensioned so that upon pivoting the arms 56*a*, 56*b* in the direction of the arrows A, A1, respectively, in FIG. 5, the cantilever mounted parts 68*a*(1) and 68*a*(2) move into the volumes bounded by the rims 46*b*, 46*a* while the cantilever mounted parts 68*b*(1) and 68*b*(2) cooperate with the rims 46*b*, 46*a* in like fashion on the other side of the vehicle. This represents the operative position for the moving apparatus 10. In this state, the cantilever mounted parts 68*a*(2) and 68*b*(2) project in opposite directions towards each other, with the cantilever mounted parts 68*a*(1) and 68*b*(1) likewise projecting oppositely and towards each other.

Figures 7, 8, 9:
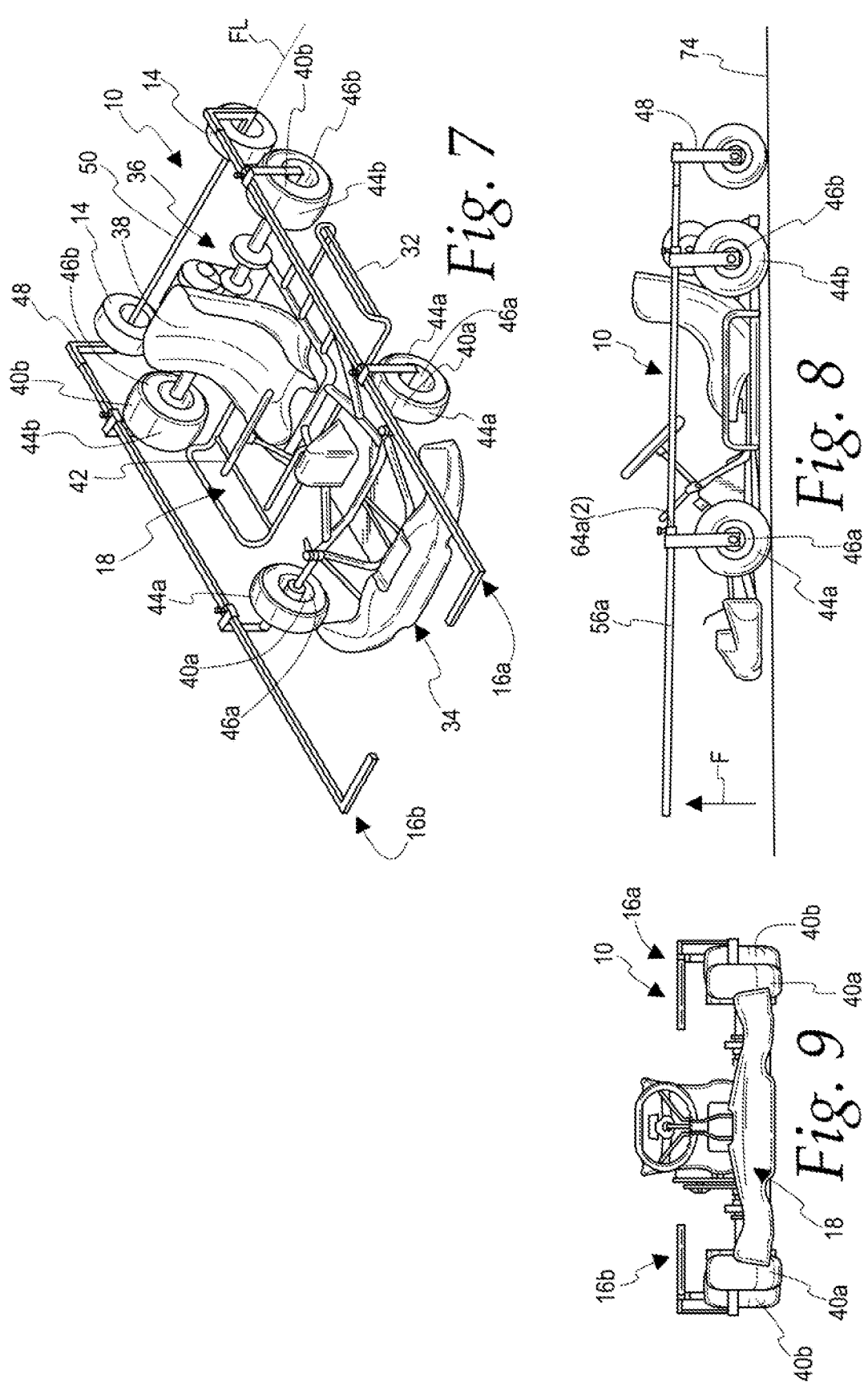
FIG. 7 is a view of the apparatus in FIGS. 4-6 in an operative position with respect to one form of vehicle as shown schematically in FIG. 2.
FIG. 8 is a side elevation view of the components in the FIG. 7 state.
FIG. 9 is a front elevation view of the components in the FIG. 7 state.

As best seen in FIGS. 7 and 8, in this state, an upward force F applied through one or both of the lifting portions 16*a*, 16*b* causes the rear wheels 14 on the apparatus 10 to be borne against the underlying surface 74 with the axle portion 50 defining a pivoting fulcrum location FL. As this occurs, the lifting parts 62 simultaneously bear on their respective rims 46, which causes the front 34 of the frame 32 to be lifted above the rear 36 thereof. Eventually, the transporting orientation of FIGS. 11 and 12 is realized wherein the vehicle weight bears on the underlying surface 74 only through the wheels 14. The long moment arm MA gives the user substantial leverage in achieving and maintaining the transporting orientation. Once in this orientation, an advancing force can be applied to the vehicle 18 and/or the frame 12, as through the graspable portions 60*a*, 60*b* of the lifting portions 16.

The depicted arrangement facilitates movement of the vehicle 18 in all directions and turning of the same to change directions.

Another form of the apparatus that facilitates leveraged repositioning of a vehicle into a similar transporting orientation is shown at 10' in FIGS. 14-23 with the same vehicle 18.

In this form, the frame 10' consists of a first unit 76 that has at least one wheel 14', and in this case two wheels 14'. A second unit 78 is made up of two elongate arms 56*a*', 56*b*', respectively defining lifting portions 16*a*', 16*b*'. The first and second units 76, 78 are independently connected to the frame 32 on the vehicle 18.

In this embodiment, a lift mechanism 80 is used to wedge beneath the rear 36 of the frame 32 to elevate the rear of the vehicle above the underlying surface 74, as seen in FIGS. 15-18.

With the vehicle 18 in this position, parallel mounting posts 82*a*, 82*b* on the first unit 76 can be slid guidingly, one each into parallel and laterally spaced frame sleeves 84*a*, 84*b*, which extend in a fore-and-aft direction. The operative position for the first unit 76, with the wheels 14' extending rearwardly past the rear 36 of the vehicle frame 32, is shown in FIGS. 19-21.

Each of the elongate arms 56*a*', 56*b*' is engaged with the vehicle frame 32 in like fashion. Exemplary elongate arm 56*a*' has a free end 86*a*' that is directed under a front bumper 88 on the vehicle until the free end 86*a*' aligns over a laterally extending, tubular frame component 90 on the vehicle 18. A downwardly opening U-shaped fitting 92*a*' is made with a shape complementary to the frame component 90 so that the frame component 90 nests in a receptacle defined by the fitting 92*a*'.

In this position, the lifting portion 16*a*' projects forwardly to beyond the bumper 88 at the front 34 of the frame 32. The elongate arm 56*a*' is made with a double bend offset so that a graspable portion 60*a*' is spaced above the supporting surface 74 with the frame 12' operatively positioned with respect to the vehicle 18 and the vehicle 18 and frame 12' supported by the wheels 14' and the lifting portions 16*a*', 16*b*' on the underlying surface 74.

Figures 19, 20, 21:
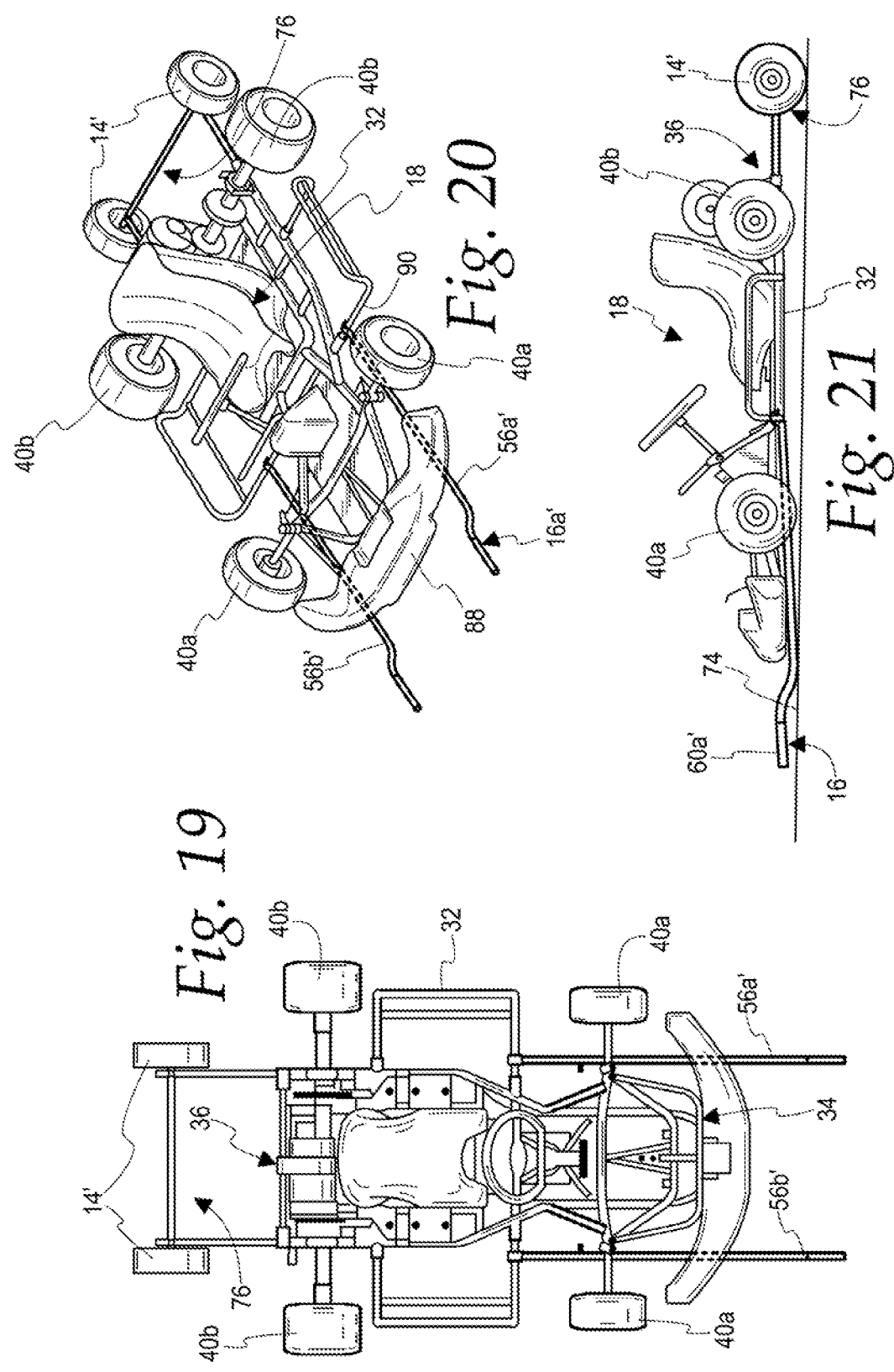
FIG. 19 is a view as in FIG. 15 wherein a separate unit on the apparatus, including wheels, is operatively positioned with respect to the vehicle.
FIG. 20 is a perspective view of the components in the FIG. 19 state.
FIG. 21 is a side elevation view of the components in the state in FIGS. 19 and 20.

In this relationship of FIGS. 19-21, the lifting portions 16*a*', 16*b*' can be engaged and raised to bear on the underside of the bumper 88 and/or a part of the frame 32 to place the vehicle 18 in the transporting orientation of FIGS. 22 and 23 whereupon the vehicle 18 can be maneuvered using the apparatus 10' in the same manner as described above for the apparatus 10.

In each form, the apparatus 10, 10' may be custom designed for a particular vehicle configuration. Adjustability may be built into each form by, without limitation, in the case of the apparatus 10, having the lifting parts 62 adjustable lengthwise relative to respective elongate arms 56 and potentially by allowing the axle 50 to be variable in length.

Additionally, for all of the lifting parts 62, and as shown for exemplary lifting part 62*a*(1), the cantilever mounted part 68*a*(1) may be adjustably mounted along the height of its respective arm length 66 by being secured through suitable fasteners F1 directed into any of a number of vertically spaced openings 96, as see on the representative arm length 66*a*(1) in FIG. 6.

The foregoing disclosure of specific embodiments is intended to be illustrative of the broad concepts comprehended by the invention.

The invention claimed is:

1. A method of transporting a wheeled vehicle along a horizontal underlying surface, the wheeled vehicle having a center of gravity between first and second locations on the wheeled vehicle spaced horizontally from each other along a first line, the method comprising the steps of:

obtaining a moving apparatus comprising a frame with at least a first wheel and at least a first lifting portion;

with wheels on the wheeled vehicle supported directly on the horizontal underlying surface, placing the moving apparatus in an operative position with respect to the wheeled vehicle wherein as viewed from a perspective along a horizontal line orthogonal to the first line: a) the at least first wheel is spaced away from the first location a distance to beyond the center of gravity; and b) the at least first lifting portion is spaced away from the second location a distance to beyond the center of gravity;

with the moving apparatus in the operative position, exerting an upward force on the at least one lifting portion using the at least first wheel as a fulcrum on the underlying surface and thereby causing the moving apparatus to exert a force on the wheeled vehicle that causes the wheeled vehicle to assume a transporting orientation wherein the first location on the wheeled vehicle is raised relative to the second location on the wheeled vehicle; and with the wheeled vehicle in the transporting orientation, exerting a force on at least one of the moving apparatus and the wheeled vehicle that causes the moving apparatus to be advanced by causing the at least first wheel to be rolled against the horizontal underlying surface.

2. The method of transporting a wheeled vehicle according to claim 1 wherein the wheeled vehicle has a frame and a front and rear and with the moving apparatus in the operative position, the at least first wheel extends away from the center of gravity past one of the front and rear of the vehicle and the at least first lifting portion extends away from the center of gravity past the other of the front and rear of the vehicle.

3. The method of transporting a wheeled vehicle according to claim 1 wherein the at least first wheel comprises the first wheel and a second wheel spaced from the first wheel and the at least first lifting portion comprises the first lifting portion and a second lifting portion spaced from the first lifting portion.

4. The method of transporting a wheeled vehicle according to claim 1 wherein the wheeled vehicle comprises a plurality of wheels each having a rim and a tire mounted on the rim, the moving apparatus comprises at least a first discrete lifting part, and the step of causing the moving apparatus to exert a force on the wheeled vehicle comprises causing the at least first discrete lifting part to exert a force on one of the vehicle wheels.

5. The method of transporting a wheeled vehicle according to claim 4 wherein the at least first discrete lifting part comprises the first lifting part and a second discrete lifting part and the step of causing the moving apparatus to exert a force on the wheeled vehicle comprises causing the second discrete lifting part to exert a force on a second of the vehicle wheels.

6. The method of transporting a wheeled vehicle according to claim 4 wherein the step of causing the moving apparatus to exert a force on the wheeled vehicle comprises causing the at least first lifting part to exert a force on the rim on the one vehicle wheel.

7. The method of transporting a wheeled vehicle according to claim 1 wherein the moving apparatus comprises at least a first lifting part, the frame comprises a first elongate arm defining the first lifting portion, and further comprising the step of guiding the at least first lifting part along the first elongate arm to place the at least first lifting part in a lifting location with respect to one of the wheeled vehicle wheels.

8. The method of transporting a wheeled vehicle according to claim 7 further comprising the step of repositioning the first elongate arm relative to the wheeled vehicle to thereby change an orientation of the at least first lifting part relative to the one wheeled vehicle wheel.

9. The method of transporting a wheeled vehicle according to claim 8 wherein the step of repositioning the first elongate arm comprises engaging the first lifting part and through manipulation of the first lifting part repositioning the first elongate arm by turning the first elongate arm around an axis.

10. The method of transporting a wheeled vehicle according to claim 1 wherein the moving apparatus frame comprises first and second elongate arms and first and second lifting parts respectively on the first and second elongate arms, each of the first and second lifting parts respectively have cantilever mounted first and second parts to respectively engage first and second wheels on the wheeled vehicle.

11. The method of transporting a wheeled vehicle according to claim 10 wherein with the moving apparatus in the operative position, the first and second cantilever mounted parts project in opposite directions away from respective first and second elongate arms.

12. The method of transporting a wheeled vehicle according to claim 10 further comprising the step of changing a position of the cantilever mounted first part relative to another part of the first lifting part.

13. The method of transporting a wheeled vehicle according to claim 1 wherein the wheeled vehicle is a go-kart.

14. The moving apparatus as recited in claim 1.

15. A method of transporting a wheeled vehicle along a horizontal underlying surface, the wheeled vehicle having a center of gravity between first and second locations on the wheeled vehicle spaced horizontally from each other along a first line, the method comprising the steps of:

obtaining a moving apparatus comprising a frame with at least a first wheel and at least a first lifting portion;

placing the moving apparatus in an operative position with respect to the wheeled vehicle wherein as viewed from a perspective along a horizontal line orthogonal to the first line: a) the at least first wheel is spaced away from the first location a distance to beyond the center of gravity; and b) the at least first lifting portion is spaced away from the second location a distance to beyond the center of gravity:

with the moving apparatus in the operative position, exerting an upward force on the at least one lifting portion using the at least first wheel as a fulcrum on the underlying surface and thereby causing the moving apparatus to exert a force on the wheeled vehicle that causes the wheeled vehicle to assume a transporting orientation wherein the first location on the wheeled vehicle is raised relative to the second location on the wheeled vehicle; and with the wheeled vehicle in the transporting orientation, exerting a force on at least one of the moving apparatus and the wheeled vehicle that causes the moving apparatus to be advanced by causing the at least first wheel to be rolled against the horizontal underlying surface, wherein the wheeled vehicle comprises a plurality of wheels each having a rim and a tire mounted on the rim, the moving apparatus comprises at least a first lifting part, and the step of causing the moving apparatus to exert a force on the wheeled vehicle comprises causing the at least first lifting part to exert a force on one of the vehicle wheels, wherein the at least first wheel comprises the first wheel and a second wheel spaced from the first wheel, the moving apparatus frame comprising a mount portion for the first and second wheels and a first elongate arm extending from the mount portion and defining the first lifting portion.

16. The method of transporting a wheeled vehicle according to claim 15 wherein the moving apparatus further comprises a second elongate arm extending from the mount portion and defining the second lifting portion, wherein the at least first lifting part comprises the first lifting part and a second lifting part, spaced from the first lifting part, the second lifting part on the second elongate arm, and the step of causing the moving apparatus to exert a force on the wheeled vehicle comprises causing the second lifting part to exert a force on the second vehicle wheel.

17. A method of transporting a wheeled vehicle along a horizontal underlying surface, the wheeled vehicle having a center of gravity between first and second locations on the wheeled vehicle spaced horizontally from each other along a first line, the method comprising the steps of:

obtaining a moving apparatus comprising a frame with at least a first wheel and at least a first lifting portion;

placing the moving apparatus in an operative position with respect to the wheeled vehicle wherein as viewed from a perspective along a horizontal line orthogonal to the first line: a) the at least first wheel is spaced away from the first location a distance to beyond the center of gravity; and b) the at least first lifting portion is spaced away from the second location a distance to beyond the center of gravity;

with the moving apparatus in the operative position, exerting an upward force on the at least one lifting portion using the at least first wheel as a fulcrum on the underlying surface and thereby causing the moving apparatus to exert a force on the wheeled vehicle that causes the wheeled vehicle to assume a transporting orientation wherein the first location on the wheeled vehicle is raised relative to the second location on the wheeled vehicle; and with the wheeled vehicle in the transporting orientation, exerting a force on at least one of the moving apparatus and the wheeled vehicle that causes the moving apparatus to be advanced by causing the at least first wheel to be rolled against the horizontal underlying surface, wherein the wheeled vehicle has a frame, the moving apparatus frame comprises first and second separate units and the step of placing the moving apparatus in the operative position comprises connecting: a) the first unit with the at least first wheel with the wheeled vehicle frame; and b) the second unit with the at least one lifting portion to the wheeled vehicle frame.

18. The method of transporting a wheeled vehicle according to claim 17 wherein the first unit and second unit are independently connected to the frame on the wheeled vehicle.

19. The method of transporting a wheeled vehicle according to claim 17 further comprising the step of using a lift mechanism to elevate the frame on the wheeled vehicle before connecting the first unit to the wheeled vehicle frame.

20. The moving apparatus as recited in claim 17.

21. A method of transporting a wheeled vehicle along a horizontal underlying surface, the wheeled vehicle having a center of gravity between first and second locations on the wheeled vehicle spaced horizontally from each other along a first line, the method comprising the steps of:

obtaining a moving apparatus comprising a frame with at least a first wheel and at least a first lifting portion;

placing the moving apparatus in an operative position with respect to the wheeled vehicle wherein as viewed from a perspective along a horizontal line orthogonal to the first line: a) the at least first wheel is spaced away from the first location a distance to beyond the center of gravity; and b) the at least first lifting portion is spaced away from the second location a distance to beyond the center of gravity;

with the moving apparatus in the operative position, exerting an upward force on the at least one lifting portion using the at least first wheel as a fulcrum on the underlying surface and thereby causing the moving apparatus to exert a force on the wheeled vehicle that causes the wheeled vehicle to assume a transporting orientation wherein the first location on the wheeled vehicle is raised relative to the second location on the wheeled vehicle; and with the wheeled vehicle in the transporting orientation, exerting a force on at least one of the moving apparatus and the wheeled vehicle that causes the moving apparatus to be advanced by causing the at least first wheel to be rolled against the horizontal underlying surface, wherein the wheeled vehicle comprises a plurality of wheels each having a rim and a tire mounted on the rim, the moving apparatus comprises at least a first lifting part, and the step of causing the moving apparatus to exert a force on the wheeled vehicle comprises causing the at least first lifting part to exert a force on one of the vehicle wheels, wherein the step of causing the moving apparatus to exert a force on the wheeled vehicle comprises causing the at least first lifting part to exert a force on the rim on the one vehicle wheel.

* * * * *